Sept. 22, 1970 — A. PITNER — 3,529,441

EXTENSIBLE UNIVERSAL JOINT

Filed Nov. 5, 1968 — 2 Sheets-Sheet 1

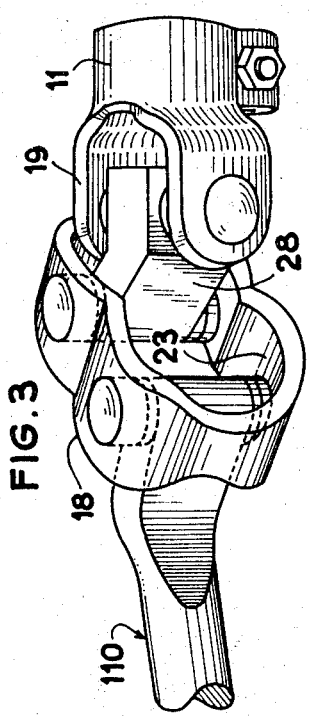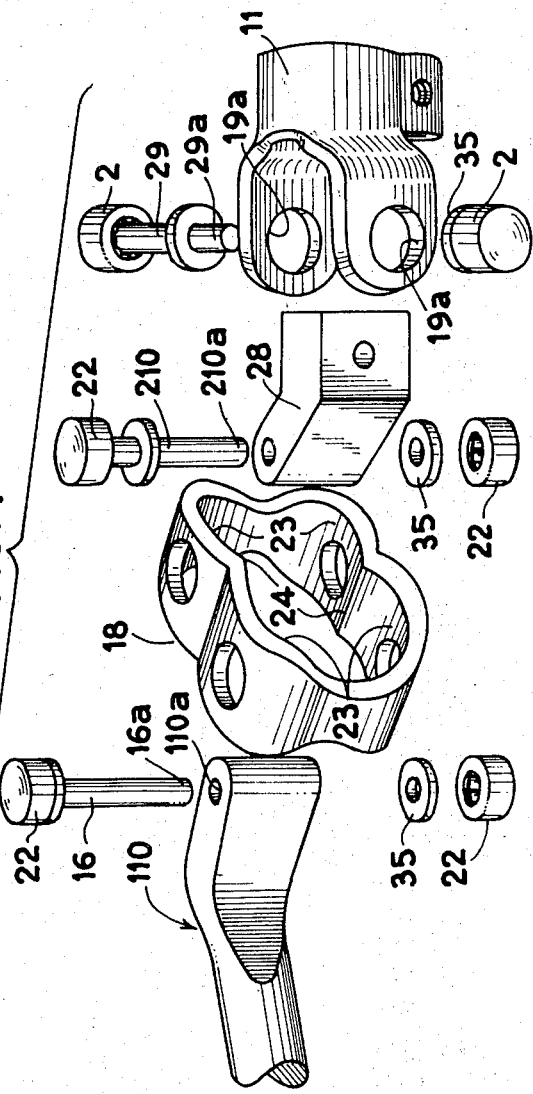

United States Patent Office 3,529,441
Patented Sept. 22, 1970

3,529,441
EXTENSIBLE UNIVERSAL JOINT
Alfred Pitner, Paris, France, assignor to Nardella S.A., a French body corporate
Filed Nov. 5, 1968, Ser. No. 773,603
Claims priority, application France, Dec. 18, 1967, 132,684
Int. Cl. F16d 3/08
U.S. Cl. 64—20         15 Claims

ABSTRACT OF THE DISCLOSURE

Extensible universal joint having a first and second end element interconnected by a pivotable assembly comprising a coupling and a cross. The first element and the cross are massive pieces respectively comprising a pivot embodying an end axis ZZ′ and orthogonal pivots respectively embodying an end pivot axis XX′ for the pivotal mounting of, the second end element and an intermediate axis YY′ parallel to the axis ZZ′ and axially offset from the axis XX′ and laterally offset from the axis of rotation of the first end element. The coupling is in the form of an annular member having two pairs of bores respectively pivotably mounted on the pivot having axis ZZ′ and the pivot having axis YY′.

---

Figure 1:
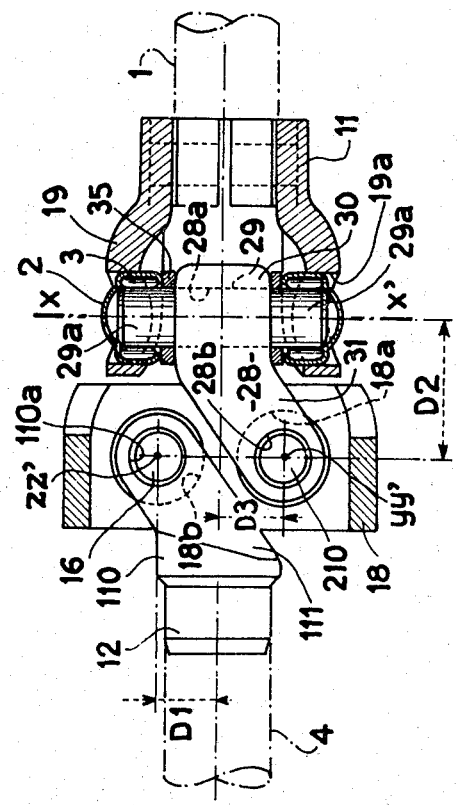

The object of the present invention is to provide an extensible universal joint for the rotary connection of two shafts or like transmission elements on which are respectively fixed a first end element which defines an end axis XX′ and a second end element which defines an end axis ZZ′ which is laterally offset relative to the corresponding axis of rotation and orthogonal to both this axis and to the first end axis XX′, these two end elements being interconnected by a pivotable assembly comprising a cross which carries two pivots embodying respectively the end axis XX′ and an intermediate axis YY′ parallel to the axis ZZ′ and axially offset relative to the axis XX′ and laterally offset relative to the first shaft and a connecting element or coupling pivoted to the second end element by means of a pivot having an axis ZZ′ and to the pivot of the cross having an axis YY′.

Such a universal joint permits relative variations not only in the orientations but also in the axial positions of the respective shafts.

In French Pat. No. 1,125,053 which describes a universal joint of this type, the pivots or journals of the cross are in one piece with the body of the cross itself, which, on one hand, requires for the grinding of the journals, bearing in mind the offset of the end axis XX′ and the intermediate axis YY′, a relatively great distance between the journals. This tends to increase the distance between the branches of the yoke constituting the first end element. Moreover, a hardening of the whole of the cross is necessary.

For purposes of remedying these drawbacks, the object of the invention is to provide a universal joint wherein the second end element and the cross are massive pieces respectively comprising the pivot embodying the end axis ZZ′ and the orthogonal pivots embodying the end axis XX′ and the intermediate axis YY′, the connecting element being in the form of an annular member having two pairs of bores for the journalling of the parallel pivots which are laterally offset in opposite directions and are respectively integral with the end element and the cross.

This arrangement has many advantages.

The end element and the cross can be constructed for example by cutting or cropping an L-shaped sectional member whose flanges make an obtuse angle and thereafter providing the flanges with bores for fixing the respective pivots. There is no need to case-harden these members since only the journals which are mounted in the bores require such a treatment.

Similarly, the grinding of the journals is carried out directly on the pivots under simple conditions since it concerns cylindrical parts. This permits reducing to a minimum the distance between the journals of the same pivot and consequently adopting a minimum distance between the branches of the corresponding yoke which results in economy of material.

Morover, it can be noted that the plane faces of the massive parts afford, if need be, a good seating for the sealing means which might be provided between the journal cups interposed between the bores and the journals.

As concerns the coupling, the fact of rendering the two bores integral with the same part enables the two axes ZZ′ and YY′ to be moved closer together. Moreover, the generally annular shape of the coupling has the advantage of affording a large inner space for accommodating the end member and the offset portion of the cross and the relative movements therebetween and this also tends to reduce the overall transverse size of the device. Further, the reception of the journals of the same pivot in two opposite walls of an annular member permits absorbing the forces set up under rational conditions.

The annular coupling, which has if desired a uniform section, can be constructed in a simple manner by forming sheet metal or by cutting from a tubular sectional element and, if need be, by welding two symmetrical half-sectional elements.

It is known from French Pat. No. 1,013,360 to construct a coupling comprising two pairs of bores for receiving the pivot journals. In the known coupling, the bores are formed in the sides of an H-shaped member whose centre portion constitutes a ring in one piece which interconnects the two sides and which has the drawback of requiring a relatively large distance between the two pairs of bores and moreover of hindering the movement of the parts situated between the two sides and which undergo angular movements.

Further features and advantages of the invention will be apparent from the ensuing description with reference to the accompanying drawings.

Figure 2:
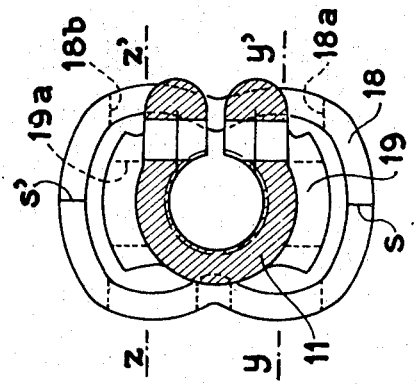

In the drawings:

FIG. 1 is an axial sectional view of the universal joint;
FIG. 2 is a cross-sectional view thereof;
FIG. 3 is a perspective view of a slightly modified construction of the joint; and
FIG. 4 is an exploded view corresponding to FIG. 3.

In the universal joint shown in FIG. 1, the yoke 19 of the joint comprises a hub 11 which is tubular in the illustrated embodiment and connected to a shaft 1 which is, for example, a driving shaft. The yoke has two aligned bores 19a adapted to receive cups 2 enclosing needles 3 and capping the journals 29a of a pivot 29 which forms part of a composite cross 28. The latter is L-shaped and comprises two flanges 30, 31 which make an obtuse angle therebetween. The horizontal flange 30 has a bore 28a in which is fixed the pivot 29 which embodies the end pivot axis XX′, whereas the oblique flange 31 has a bore 28b which is orthogonal to the axis XX′ and axially offset to the extent $D_2$ relative to the latter and laterally offset from the shaft 1 the extent $D_3$, this bore receiving a pivot 210 which embodies an intermediate pivot axis YY′.

The driven shaft 4 is for example fixed by welding to the hub 12 of an end element 110 which comprises a portion 111 which is obliquely oriented opposite the flange 31 of the cross 28 relative to the hub 12 and in which is formed a bore 110a which is orthogonal to the shaft 4 and consequently offset relative to the axis of rotation of this shaft to the extent $D_1$.

Fixed in the bore 110a is a pivot 16 which embodies an end pivot axis ZZ' parallel to the intermediate axis YY'. The two corresponding pivots 16 and 210 terminate in journals 16a, 210a which are engaged through needle-containing cups 22 in pairs of bores 18a and 18b formed in the opposite walls of a tubular connecting element or coupling 18.

The cross 28 can be obtained from cutting or cropping an L-shaped sectional member whose flanges make an obtuse angle.

The end element 110 can itself be produced from a similar or identical sectional member.

As concerns the coupling 18, it can be constructed by forming sheet metal or by cutting a tubular sectional element or by welding edge-to-edge, as shown at SS' in FIG. 2, two elements cut from half-sectional elements.

In the illustrated embodiment, the opposite walls of the coupling 18 have a double-concave shape 23, the concave portions being connected in a convex zone 24. The bores are formed in the concave portions 23. Such an arrangement affords a good support zone for the needle cups 22 in the direction of the transmission of the forces while providing in the bottom of the concavity surplus material which permits, if required, retaining the needle cups by a forming-over operation.

The plane faces of the journal 28 and those of the end member 110 form bearing faces for sealing rings 35 which could be provided for protecting the needle cups 2, 22.

It will be observed that the three pivots 29, 210, 16 can constitute strictly identical parts which obviously make for simplicity and economy of manufacture.

It must also be mentioned that the two massive parts, namely the cross 28 and the end member 110 which are respectively provided with pivots 29, 210 and 16 can be produced by forging, the end member 110 being for example formed directly on the end shaft 4 as illustrated in FIGS. 3 and 4.

When the conditions of operation of the mechanical assembly (overall size, out of balance etc.) allow it, and in order to simplify manufacture, it is possible to eliminate the offset between the axis ZZ' and the longitudinal axis of the shaft 4 by eliminating the obliquity of the flange 111 of the end member 110, the axis ZZ' remaining laterally offset to the extent $D_1$ from the corresponding axis of rotation.

Although specific embodiments of the invention have been described, many modifications and changes may be made therein.

Having now described my invention what I claim as new and desire to secure by Letters Patent is:

1. In an extensible universal joint for the rotary connection of a first transmission member and a second transmission member on which are respectively fixed a first end element which defines an end axis XX' and a second end element which defines an end axis ZZ' which is laterally offset relative to the axis of rotation of said second transmission member and orthogonal to said axis of rotation and to said end axis XX', said two end elements being interconnected by a pivotable assembly comprising a cross which carries two pivots embodying respectively said end axis XX' and an intermediate axis YY', which is parallel to said axis ZZ' and axially offset relative to said axis XX' and laterally offset relative to said first transmission member, and a coupling pivoted to said second end element by a pivot having an axis ZZ' and to said pivot having said axis YY'; the feature that said second end element and said cross are massive pieces respectively comprising said pivot embodying said axis ZZ' and the orthogonal pivots embodying said axis XX' and said intermediate axis YY', said coupling being in the form of an annular member having two pairs of bores respectively pivotably mounted on said pivot having said axis ZZ' and said pivot having said axis YY'.

2. A joint as claimed in claim 1, wherein said cross is an L-shaped sectional element having flanges which make an obtuse angle.

3. A joint as claimed in claim 1, wherein said cross is a forged cross.

4. A joint as claimed in claim 1, wherein said second end element is a sectional element having an L-section having flanges which make an obtuse angle.

5. A joint as claimed in claim 1, wherein said second end element is an integral part of said second transmission member.

6. A joint as claimed in claim 1, wherein said second end element is a forged element.

7. A joint as claimed in claim 1, wherein said coupling has wall portions having an inner concavity and in which said bores are provided.

8. A joint as claimed in claim 1, wherein said coupling is a portion of a tubular sectional element.

9. A joint as claimed in claim 1, wherein said coupling is produced by forming a plane blanked metal sheet.

10. A joint as claimed in claim 9, wherein said metal sheet has interconnected ends.

11. A joint as claimed in claim 1, wherein said coupling comprises two half-sectional elements welded edge-to-edge.

12. A joint as claimed in claim 1, where said three pivots are located in corresponding bores in said coupling and said first end element with the interposition of cup bearings.

13. A joint as claimed in claim 12, wherein said cup bearings are needle rolling bearings.

14. A joint as claimed in claim 12, wherein said bearings are sealed by sealing rings applied thereagainst and against a corresponding adjacent plane face of said cross and said second end element.

15. A joint as claimed in claim 1, wherein said pivots are identical.

References Cited

UNITED STATES PATENTS

| | | | |
|---|---|---|---|
| 719,611 | 2/1903 | Robinson et al. | 64—20 |
| 731,225 | 6/1903 | Robinson | 64—20 |
| 3,385,081 | 5/1968 | Wier | 64—21 |

FOREIGN PATENTS

| | | |
|---|---|---|
| 1,125,053 | 7/1956 | France. |

JAMES A. WONG, Primary Examiner

UNITED STATES PATENT OFFICE
CERTIFICATE OF CORRECTION

Patent No. 3,529,441　　　　　　　　Dated September 22, 1970

Inventor(s) ALFRED PITNER

It is certified that error appears in the above-identified patent and that said Letters Patent are hereby corrected as shown below:

In the Heading, Column 1, line 3 change "assignor to Nardella S.A.," to read --assignor of an undivided one-half interest to Nadella S.A.,--

Signed and sealed this 15th day of January 1974.

(SEAL)
Attest:

EDWARD M. FLETCHER, JR.　　　　　RENE D. TEGTMEYER
Attesting Officer　　　　　　　　Acting Commissioner of Patents